United States Patent
Jin et al.

(10) Patent No.: US 11,653,330 B2
(45) Date of Patent: May 16, 2023

(54) RNA ALLOCATION METHOD, NETWORK DEVICE, AND TERMINAL

(71) Applicant: Huawei Technologies Co., Ltd., Shenzhen (CN)

(72) Inventors: Yinghao Jin, Shanghai (CN); Hong Li, Shanghai (CN); Feng Han, Shanghai (CN); Wei Tan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/784,674

(22) Filed: Feb. 7, 2020

(65) Prior Publication Data
US 2020/0178209 A1 Jun. 4, 2020

Related U.S. Application Data
(63) Continuation of application No. PCT/CN2018/098897, filed on Aug. 6, 2018.

(30) Foreign Application Priority Data

Aug. 9, 2017 (CN) .......................... 201710677166.0

(51) Int. Cl.
*H04W 68/02* (2009.01)
*H04W 8/14* (2009.01)
*H04W 36/00* (2009.01)

(52) U.S. Cl.
CPC ............. *H04W 68/02* (2013.01); *H04W 8/14* (2013.01); *H04W 36/0055* (2013.01)

(58) Field of Classification Search
CPC ....... H04W 8/14; H04W 24/02; H04W 36/00; H04W 36/0055; H04W 36/0083; H04W 36/08; H04W 36/38; H04W 60/00; H04W 68/02; Y02D 30/70
See application file for complete search history.

(56) References Cited

U.S. PATENT DOCUMENTS

| | | |
|---|---|---|
| 2012/0150998 A1 | 6/2012 | Wang |
| 2012/0270556 A1 | 10/2012 | Yin et al. |

(Continued)

FOREIGN PATENT DOCUMENTS

| | | |
|---|---|---|
| CN | 101052204 A | 10/2007 |
| CN | 101686467 A | 3/2010 |

(Continued)

OTHER PUBLICATIONS

Nokia et al., "RAN-based Notification Area", R2-1706839, 3GPP TSG-RAN WG2 Meeting #98, Hangzhou, China, May 15-19, 2017 (Year: 2017).*

(Continued)

*Primary Examiner* — Khoa Huynh
(74) *Attorney, Agent, or Firm* — Slater Matsil, LLP

(57) ABSTRACT

This application provides an RNA allocation method, a network device, and a terminal. The method includes receiving, by a first network device, a second message sent by a second network device, where the second message carries RPA information of the second network device, and the RPA information is used to identify an RPA. The method also includes sending, by the first network device, a third message to the second network device.

11 Claims, 6 Drawing Sheets

(56) References Cited

U.S. PATENT DOCUMENTS

| | | | |
|---|---|---|---|
| 2015/0124708 A1* | 5/2015 | Blankenship | H04W 36/08 |
| | | | 370/329 |
| 2015/0148062 A1 | 5/2015 | Chen et al. | |
| 2015/0365202 A1* | 12/2015 | Kudo | H04L 51/38 |
| | | | 370/312 |
| 2017/0195989 A1 | 7/2017 | Zhang et al. | |
| 2018/0220486 A1* | 8/2018 | Tseng | H04W 76/27 |
| 2018/0234894 A1 | 8/2018 | Jiang | |
| 2018/0270792 A1* | 9/2018 | Park | H04W 76/28 |
| 2019/0261447 A1* | 8/2019 | Fujishiro | H04W 68/00 |

FOREIGN PATENT DOCUMENTS

| | | | | |
|---|---|---|---|---|
| CN | 101998433 A | | 3/2011 | |
| CN | 103220653 A | | 7/2013 | |
| CN | 105813054 A | | 7/2016 | |
| CN | 106465332 A | | 2/2017 | |
| CN | 106658758 A | | 5/2017 | |
| CN | 108282818 A | | 7/2018 | |
| EP | 2793512 A1 | | 10/2014 | |
| EP | 3516890 A2 | | 7/2019 | |
| KR | 20060043533 A | * | 5/2006 | |
| WO | 2014048356 A1 | | 4/2014 | |
| WO | 2017097932 A1 | | 6/2017 | |
| WO | 2018170516 A2 | | 9/2018 | |
| WO | WO-2018170516 A2 | * | 9/2018 | H04W 24/04 |

OTHER PUBLICATIONS

Huawei, "Periodic RAN-based notification area update", 3GPP TSG-RAN WG3 NR AdHoc, R3-172388, Qingdao, China, Jun. 27-29, 2017, 4 pages.

Intel Corporation, "Benefits of RAN based paging (light connection)," 3GPP TSG RAN WG3 Meeting #93 R3-161583, Goteburg, Sweden, Aug. 22-26, 2016, 9 pages.

Huawei et al., "RAN notification area configuration," 3GPP TSG-RAN WG2 Meeting #98, R2-1704889, Hangzhou, China, May 15-19, 2017, 3 pages.

3rd Generation Partnership Project; Technical Specification Group Radio Access Network; Evolved Universal Terrestrial Radio Access (E-UTRA); Radio Resource Control (RRC); Protocol specification (Release 14), 3GPP TS 36.331 V14.3.0 (Jun. 2017), 745 pages.

3rd Generation Partnership Project; Technical Specification Group Radio Access Network; NG Radio Access Network (NG-RAN); Xn application protocol (XnAP) (Release 15), 3GPP TS 38.423 V0.1.1 (Jun. 2017), 53 pages.

3rd Generation Partnership Project; Technical Specification Group Radio Access Network; NR;Radio Resource Control (RRC); Protocol specification (Release 15), 3GPP TS 38.331 V0.0.4 (Jun. 2017), 22 pages.

3GPP TS 36.423 V14.3.0 (Jun. 2017), 3rd Generation Partnership Project; Technical Specification Group Radio Access Network; Evolved Universal Terrestrial Radio Access Network (E-UTRAN); X2 application protocol (X2AP) (Release 14), 242 pages.

Nokia et al., "RAN-based Notification Area", 3GPP TSG RAN WG2 Meeting #98, R2-1706839, Hangzhou, China, May 15-19, 2017, 4 pages.

\* cited by examiner

Exchange information about whether an inactive state is supported

Exchange RNA information

RNA ALLOCATION METHOD, NETWORK DEVICE, AND TERMINAL

CROSS-REFERENCE TO RELATED APPLICATIONS

This application is a continuation of International Application No. PCT/CN2018/098897, filed on Aug. 6, 2018, which claims priority to Chinese Patent Application No. 2017/10677166.0, filed on Aug. 9, 2017. The disclosures of the aforementioned applications are hereby incorporated by reference in their entireties.

TECHNICAL FIELD

This application relates to the field of communications technologies, and in particular, to an RNA allocation method, a network device, and a terminal.

BACKGROUND

A radio resource control (RRC) inactive state may also be referred to as an inactive state, and is a communication state of a terminal newly defined in 5G. In the inactive state, a core network, a network device, and a terminal all keep corresponding context information. The network may not be notified when the terminal in the inactive state is moved within a radio access network (RAN)-based notification area (RNA), but the network needs to be notified after the terminal is moved out of an RNA that is allocated by a network side for the terminal in the inactive state. When a terminal is moved from an old network device to a new network device, in some cases, the new network device may reallocate an RNA to the terminal. These cases may include the following: The new network device and the old network device belong to different RNAs, or the new network device is located at an edge of a current RNA during a periodic RNA update process.

However, in the current technology, there is no solution for a problem that which cell needs to be included in the reallocated RNA.

SUMMARY

This application provides an RNA allocation method, a network device, and a terminal, so that when an RNA needs to be reallocated to a terminal in an inactive state (or a connected state), the RNA is allocated to the terminal device based on information (which may alternatively be understood as a moving track of the terminal) about an RNA recently accessed by the terminal and/or whether the inactive state is supported. In this way, RNA allocation is more appropriate, thereby reducing aperiodic RNA updates and reducing signaling overheads and power consumption. In addition, in this application, the message may further carry stay duration of the terminal, to enrich the moving track of the terminal, so that a network side can make a more accurate judgment and then the network side can more accurately allocate a new RNA.

A first aspect provides an RNA allocation method. The method includes: receiving, by a first network device, a first message sent by a terminal, where the first message carries information about an RNA recently accessed by the terminal; and sending, by the first network device, a reply message for the first message to the terminal, where the reply message carries information about an RNA allocated by the first network device to the terminal.

In a possible implementation of the first aspect, the information about the RNA recently accessed by the terminal is used to indicate at least one cell or at least one network device that is accessed by the terminal before the terminal is moved to the first network device.

In a possible implementation of the first aspect, a representation manner of the RNA information includes one or a combination of the following information: radio access network paging area information, cell identification information, base station identification information, tracking area information, and registration area information.

In a possible implementation of the first aspect, after the receiving, by a first network device, a first message sent by a terminal and before the sending, by the first network device, a reply message for the first message to the terminal, the method further includes: determining, by the first network device based on the information about the RNA recently accessed by the terminal, whether to reallocate an RNA to the terminal.

In a possible implementation of the first aspect, the RNA allocated by the first network device to the terminal is allocated based on the information about the RNA recently accessed by the terminal.

In a possible implementation of the first aspect, the first message further carries stay duration of the terminal, and the stay duration is duration of staying in the at least one cell or the at least one network device that is indicated by the information about the RNA recently accessed by the terminal.

In a possible implementation of the first aspect, the RNA allocated by the first network device to the terminal is allocated based on the stay duration of the terminal.

In a possible implementation of the first aspect, after the receiving, by a first network device, a first message sent by a terminal and before the sending, by the first network device, a reply message for the first message to the terminal, the method further includes: determining, by the first network device, whether an inactive state is supported, where whether the inactive state is supported includes at least one or a combination of the following: whether the first network device supports the inactive state, whether a cell in which the terminal is currently located supports the inactive state, and whether a PLMN corresponding to a cell in which the terminal is currently located supports the inactive state.

In a possible implementation of the first aspect, the RNA allocated by the first network device to the terminal is allocated based on the information about the RNA recently accessed by the terminal and whether the inactive state is supported as determined by the first network device.

In a possible implementation of the first aspect, after the receiving, by a first network device, a first message sent by a terminal and before the sending, by the first network device, a reply message for the first message to the terminal, the method further includes: receiving, by the first network device, a feedback message sent by a second network device, where the feedback message carries a quantity of periodic RNA updates of the terminal, and the quantity of periodic RNA updates includes a quantity of periodic RNA updates already performed after the terminal transits from a connected state to the inactive state. The first network device may determine, based on a received quantity of periodic RNA updates, whether to set the terminal to the inactive state or directly set the terminal to an idle state. In a possible implementation of the first aspect, the method further includes: receiving, by the first network device, RNA information of the second network device sent by the second network device.

In a possible implementation of the first aspect, the method further includes: receiving, by the first network device, information that is sent by the second network device and that indicates whether the inactive state is supported.

According to a second aspect, an RNA allocation method is provided. The method includes: sending, by a terminal, a first message to a first network device, where the first message carries information about an RNA recently accessed by the terminal; and receiving, by the terminal, a reply message sent by the first network device for the first message, where the reply message carries information about an RNA allocated by the first network device to the terminal.

In a possible implementation of the second aspect, the information about the RNA recently accessed by the terminal is used to indicate at least one cell or at least one network device that is accessed by the terminal before the terminal is moved to the first network device.

In a possible implementation of the second aspect, a representation manner of the RNA information includes one or a combination of the following information: radio access network paging area information, cell identification information, base station identification information, tracking area information, and registration area information.

In a possible implementation of the second aspect, the first message further carries stay duration of the terminal, and the stay duration is duration of staying in the at least one cell or the at least one network device that is indicated by the information about the RNA recently accessed by the terminal.

According to a third aspect, an RNA allocation network device is provided. The network device includes: a receiving unit, configured to receive a first message sent by a terminal, where the first message carries information about an RNA recently accessed by the terminal; and a sending unit, configured to send a reply message for the first message to the terminal, where the reply message carries information about an RNA allocated by the first network device to the terminal.

In a possible implementation of the third aspect, the information about the RNA recently accessed by the terminal is used to indicate at least one cell or at least one network device that is accessed by the terminal before the terminal is moved to the first network device.

In a possible implementation of the third aspect, a representation manner of the RNA information includes one or a combination of the following information: radio access network paging area information, cell identification information, base station identification information, tracking area information, and registration area information.

In a possible implementation of the third aspect, the network device further includes a determining unit, where the determining unit is configured to determine, based on the information about the RNA recently accessed by the terminal, whether to reallocate an RNA to the terminal.

In a possible implementation of the third aspect, the RNA allocated by the first network device to the terminal is allocated based on the information about the RNA recently accessed by the terminal.

In a possible implementation of the third aspect, the first message further carries stay duration of the terminal, and the stay duration is duration of staying in the at least one cell or the at least one network device that is indicated by the information about the RNA recently accessed by the terminal.

In a possible implementation of the third aspect, the network device further includes a determining unit, configured to determine whether an inactive state is supported, where whether the inactive state is supported includes at least one or a combination of the following: whether the first network device supports the inactive state, whether a cell in which the terminal is currently located supports the inactive state, and whether a PLMN corresponding to a cell in which the terminal is currently located supports the inactive state.

In a possible implementation of the third aspect, the RNA allocated by the first network device to the terminal is allocated based on the information about the RNA recently accessed by the terminal and whether the inactive state is supported as determined by the first network device.

In a possible implementation of the third aspect, the receiving unit is further configured to: receive a feedback message sent by a second network device, where the feedback message carries a quantity of periodic RNA updates of the terminal, and the quantity of periodic RNA updates includes a quantity of periodic RNA updates already performed after the terminal transits from a connected state to the inactive state.

In a possible implementation of the third aspect, the receiving unit is further configured to receive RNA information of the second network device sent by the second network device.

In a possible implementation of the third aspect, the receiving unit is further configured to receive information that is sent by the second network device and that indicates whether the inactive state is supported.

According to a fourth aspect, an RNA allocation terminal is provided. The terminal includes: a sending unit, configured to send a first message to a first network device, where the first message carries information about an RNA recently accessed by the terminal; and a receiving unit, configured to receive a reply message sent by the first network device for the first message, where the reply message carries information about an RNA allocated by the first network device to the terminal, and the information about the RNA recently accessed by the terminal is used to indicate at least one cell or at least one network device that is accessed by the terminal before the terminal is moved to the first network device.

In a possible implementation of the fourth aspect, the first message further carries stay duration of the terminal, and the stay duration is duration of staying in the at least one cell or the at least one network device that is indicated by the information about the RNA recently accessed by the terminal.

According to a fifth aspect, an RNA allocation network device is provided. The network device includes a transmitter, a receiver, and a processor; the receiver is configured to receive a first message sent by a terminal, where the first message carries information about an RNA recently accessed by the terminal; and the transmitter is configured to send a reply message for the first message to the terminal, where the reply message carries information about an RNA allocated by the first network device to the terminal.

In a possible implementation of the fifth aspect, the information about the RNA recently accessed by the terminal is used to indicate at least one cell or at least one network device that is accessed by the terminal before the terminal is moved to the first network device.

In a possible implementation of the fifth aspect, a representation manner of the RNA information includes one or a combination of the following information: radio access network paging area information, cell identification information, base station identification information, tracking area information, and registration area information.

In a possible implementation of the fifth aspect, the processor is configured to determine, based on the information about the RNA recently accessed by the terminal, whether to reallocate an RNA to the terminal.

In a possible implementation of the fifth aspect, the RNA allocated by the first network device to the terminal is allocated based on the information about the RNA recently accessed by the terminal.

In a possible implementation of the fifth aspect, the first message further carries stay duration of the terminal, and the stay duration is duration of staying in the at least one cell or the at least one network device that is indicated by the information about the RNA recently accessed by the terminal.

In a possible implementation of the fifth aspect, the processor is configured to determine whether an inactive state is supported, where whether the inactive state is supported includes at least one or a combination of the following: whether the first network device supports the inactive state, whether a cell in which the terminal is currently located supports the inactive state, and whether a PLMN corresponding to a cell in which the terminal is currently located supports the inactive state.

In a possible implementation of the fifth aspect, the RNA allocated by the first network device to the terminal is allocated based on the information about the RNA recently accessed by the terminal and whether the inactive state is supported as determined by the first network device.

In a possible implementation of the fifth aspect, the receiver is further configured to: receive a feedback message sent by a second network device, where the feedback message carries a quantity of periodic RNA updates of the terminal, and the quantity of periodic RNA updates includes a quantity of periodic RNA updates already performed after the terminal transits from a connected state to the inactive state.

In a possible implementation of the fifth aspect, the receiver is further configured to receive RNA information of the second network device sent by the second network device.

In a possible implementation of the fifth aspect, the receiver is further configured to receive information that is sent by the second network device and that indicates whether the inactive state is supported.

According to a sixth aspect, an RNA allocation terminal is provided, and the terminal includes a transmitter, a receiver, and a processor; the transmitter is configured to send a first message to a first network device, where the first message carries information about an RNA recently accessed by the terminal; and the receiver is configured to receive a reply message sent by the first network device for the first message, where the reply message carries information about an RNA allocated by the first network device to the terminal. The information about the RNA recently accessed by the terminal is used to indicate at least one cell or at least one network device that is accessed by the terminal before the terminal is moved to the first network device.

In a possible implementation of the sixth aspect, the first message further carries stay duration of the terminal, and the stay duration is duration of staying in the at least one cell or the at least one network device that is indicated by the information about the RNA recently accessed by the terminal.

According to a seventh aspect, a computer readable storage medium is provided, where the computer readable storage medium includes an instruction, and when the instruction is run on a computer, the computer performs the method in any one of the foregoing aspects.

According to an eighth aspect, a computer program product is provided, where the program product includes an instruction, and when the instruction is run on a computer, the computer performs the method in any one of the foregoing aspects.

According to a ninth aspect, a computer program is provided, where when the computer program is run on a computer, the computer performs the method in any one of the foregoing aspects.

This application further provides a method for determining, based on a quantity of periodic RNA updates of a terminal, to set the terminal to a particular state; and a network device and a terminal thereof. For a terminal in an inactive state, a new network device determines, based on a quantity of periodic RNA updates of the terminal and/or whether there is data that needs to be sent, to set the terminal to a particular state. The quantity of periodic RNA updates can reflect activeness of the terminal, and it is determined, in combination with this parameter, to set the terminal to a particular state, so that allocation is more accurate, thereby reducing state transitions and reducing signaling overheads and power consumption.

According to a tenth aspect, a method for setting a state of a terminal is provided. The method includes: receiving, by a first network device, a feedback message sent by a device, where the feedback message carries a quantity of periodic RNA updates of the terminal, and the quantity of periodic RNA updates includes a quantity of periodic RNA updates already performed after the terminal transits from a connected state to an inactive state; and sending, by the first network device, a reply message for the first message to the terminal, where the reply message is used to instruct to set the terminal to a particular state.

In a possible implementation of the tenth aspect, the device includes a second network device and/or the terminal.

In a possible implementation of the tenth aspect, when the quantity of periodic RNA updates is greater than or equal to a preset value, the reply message is used to set the terminal to the inactive state or an idle state.

In a possible implementation of the tenth aspect, if the terminal is set to or stays in the inactive state, the first network device or the terminal continues to perform counting on a basis of the received quantity of periodic RNA updates.

In a possible implementation of the tenth aspect, if the terminal is set to or stays in the connected state, the first network device or the terminal sets the received quantity of periodic RNA updates to a preset value, for example, the preset value is zero; or clears a value of the quantity of periodic RNA updates.

In a possible implementation of the tenth aspect, if the terminal is set to or stays in the connected state, the first network device or the terminal counts a quantity of periodic RNA updates again.

In a possible implementation of the tenth aspect, if the terminal is set to an idle state, the first network device or the terminal sets the received quantity of periodic RNA updates to a preset value, for example, the preset value is zero; or clears a value of the quantity of periodic RNA updates.

In a possible implementation of the tenth aspect, if the terminal is set to or stays in an idle state, the first network device or the terminal counts a quantity of periodic RNA updates again.

According to an eleventh aspect, a method for setting a state of a terminal is provided. The method includes: sending, by a terminal, an RRC message to a first network device, where the RRC message carries a quantity of periodic RNA updates of the terminal, and the quantity of periodic RNA updates includes a quantity of periodic RNA updates already performed after the terminal transits from a connected state to an inactive state; and receiving, by the terminal, a reply message, where the reply message is used to instruct to set the terminal to a particular state.

In a possible implementation of the eleventh aspect, when the quantity of periodic RNA updates is greater than or equal to a preset value, the reply message is used to set the terminal to the inactive state or an idle state.

In a possible implementation of the eleventh aspect, if the terminal is set to or stays in the inactive state, the first network device or the terminal continues to perform counting on a basis of the received quantity of periodic RNA updates.

In a possible implementation of the eleventh aspect, if the terminal is set to or stays in the connected state, the first network device or the terminal sets the received quantity of periodic RNA updates to a preset value, or clears a value of the quantity of periodic RNA updates.

In a possible implementation of the eleventh aspect, if the terminal is set to or stays in the connected state, the first network device or the terminal counts a quantity of periodic RNA updates again.

In a possible implementation of the eleventh aspect, if the terminal is set to an idle state, the first network device or the terminal sets the received quantity of periodic RNA updates to a preset value, for example, the preset value is zero; or clears a value of the quantity of periodic RNA updates.

In a possible implementation of the eleventh aspect, if the terminal is set to or stays in an idle state, the first network device or the terminal counts a quantity of periodic RNA updates again.

According to a twelfth aspect, a method for setting a state of a terminal is provided. The method includes: sending, by a second network device, a feedback message to a first network device, where the feedback message carries a quantity of periodic RNA updates of the terminal, and the quantity of periodic RNA updates includes a quantity of periodic RNA updates already performed after the terminal transits from a connected state to an inactive state; and receiving, by the second network device, a release message sent by the first network device, where the release message is used to instruct to release a context of the terminal.

In a possible implementation of the twelfth aspect, the release message sent by the first network device includes identification information of the terminal device. For example, the identification information may be a Resume ID.

According to a thirteenth aspect, a network device is provided, where the network device includes a receiving unit and a sending unit, and the receiving unit and the sending unit are configured to perform the method in any one of the foregoing aspects.

According to a fourteenth aspect, a network device is provided, where the network device includes a receiver and a transmitter, and the receiver and the transmitter are configured to perform the method in any one of the foregoing aspects.

According to a fifteenth aspect, a terminal is provided, where the terminal includes a receiving unit and a sending unit, and the receiving unit and the sending unit are configured to perform the method in any one of the foregoing aspects.

According to a sixteenth aspect, a terminal is provided, where the terminal includes a receiver and a transmitter, and the receiver and the transmitter are configured to perform the method in any one of the foregoing aspects.

According to a seventeenth aspect, a computer readable storage medium is provided, where the computer readable storage medium includes an instruction, and when the instruction is run on a computer, the computer performs the method in any one of the foregoing aspects.

According to an eighteenth aspect, a computer program product is provided, where the program product includes an instruction, and when the instruction is run on a computer, the computer performs the method in any one of the foregoing aspects.

According to a nineteenth aspect, a computer program is provided, where when the computer program is run on a computer, the computer performs the method in any one of the foregoing aspects.

This application further provides an RPA information exchange method so that RPA information can be exchanged during a process of setting up an interface between network devices or during a network device update process, thereby enabling a network device to more accurately allocate an RNA to a terminal.

According to a twentieth aspect, a method is provided, including: sending, by a first network device, a third message to a second network device; and sending, by the second network device, a fourth message to the first network device, where the fourth message is a reply message for the third message.

In a possible implementation of the twentieth aspect, the third message may include a message used for setting up an interface and/or a message used for updating.

In a possible implementation of the twentieth aspect, the third message includes an Xn interface setup request message or a gNB configuration update message.

In a possible implementation of the twentieth aspect, the fourth message includes an Xn setup feedback message or a gNB configuration update confirmation message.

In a possible implementation of the twentieth aspect, the third message carries RPA information of the first network device, and the fourth message carries RPA information of the second network device.

It should be understood that, this application further provides a network device, a computer storage medium, a program, and the like that are configured to perform the foregoing method.

This application further provides an inactive state exchange method so that an inactive state can be exchanged during a process of setting up an interface between network devices or during a network device update process, thereby enabling a network device to more accurately allocate an RNA to a terminal.

According to a twenty-first aspect, a method is provided, including: sending, by a first network device, a third message to a second network device; and sending, by the second network device, a fourth message to the first network device, where the fourth message is a reply message for the third message.

In a possible implementation of the twenty-first aspect, the third message may include a message used for setting up an interface and/or a message used for updating.

In a possible implementation of the twenty-first aspect, the third message includes an Xn interface setup request message or a gNB configuration update message.

In a possible implementation of the twenty-first aspect, the fourth message includes an Xn setup feedback message or a gNB configuration update confirmation message.

In a possible implementation of the twenty-first aspect, the third message carries information about whether the first network device supports an inactive state, and/or the fourth message carries information about whether the second network device supports the inactive state.

In a possible implementation of the twenty-first aspect, whether the inactive state is supported includes at least one or a combination of the following: whether the first network device/the second network device supports the inactive state, whether a cell in which a terminal is currently located supports the inactive state, and whether a PLMN corresponding to a cell in which the terminal is currently located supports the inactive state.

It should be understood that, this application further provides a network device, a computer storage medium, a program, and the like that are configured to perform the foregoing method.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show some embodiments of this application, and a person of ordinary skill in the art may still derive another drawing from these accompanying drawings without creative efforts.

DETAILED DESCRIPTION OF ILLUSTRATIVE EMBODIMENTS

Figure 1:
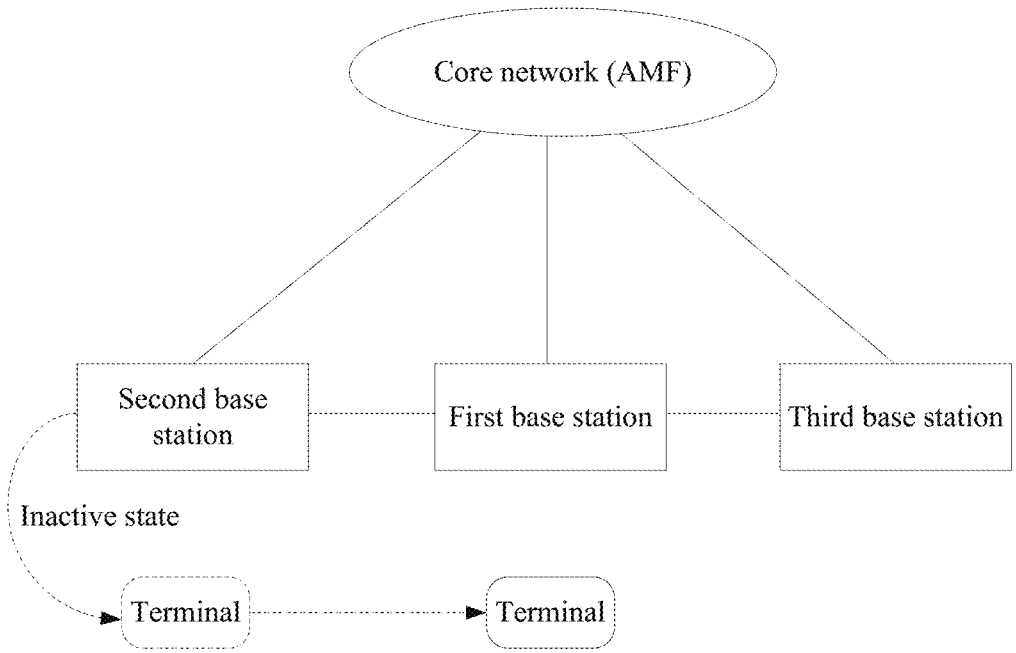
FIG. 1 is a diagram of a network architecture to which an embodiment of this application is applicable.

The terms used in this application are merely intended to describe a particular possible implementation rather than to limit this application. The terms "a", "said" and "the" for a singular form used in this application including the attached claims are also intended to include a case of a plural form, unless otherwise clearly stated. It should be further understood that the term "and/or" used in this specification means any or all possible combinations of one or more listed related items. It should be further understood that, the term "include" used in this specification specifies presence of the features, data, information, entireties, steps, operations, elements and/or components, without excluding presence or attachment of one or more other features, data, information, entireties, steps, operations, elements, components, and/or a combination thereof.

It should be understood that, although terms such as "first" and "second" may be used in the embodiments of this application to describe various network devices or messages, these network devices or messages should not be limited by the terms. These terms are merely used to differentiate the network devices or messages from each other. For example, a first network device may be referred to as a second network device without departing from the scope of the embodiments of this application. Similarly, a second network device may be referred to as a first network device. This also applies to a message.

It should be noted that an order of steps in this application may be freely arranged. This is not limited in this application.

The following describes technical solutions in the embodiments of this application with reference to the accompanying drawings.

Some terms in this application are first described, to help a person skilled in the art have a better understanding.

(1) Network device: It may be any device that has a wireless transceiver function, including but not limited to: a network device (for example, a base station NodeB, an evolved Node B eNodeB, or a next-generation NodeB (gNB) in a fifth generation (5G) communications system), a network device in a future communications system, an access node in a Wi-Fi system, a wireless relay node, a wireless backhaul node, or the like. In addition, the network device may be a radio controller in a cloud radio access network (CRAN) scenario. Alternatively, the network device may be a network device in a 5G network or a network device in a future evolved network; or may be a wearable device, an in-vehicle device, or the like. Alternatively, the network device 100 may be a small cell, a transmission reception point (TRP), or the like. This is certainly not limited in this application.

(2) Old network device: An old network device is a network device that maintains a connection between a core network and an RAN-side control plane for an inactive terminal. Usually the old network device may be understood as a network device that controls a terminal to transit from a connected state to an inactive state, but another case is not excluded. For example, in an RNA update process, an inactive terminal without data transmission still stays in the inactive state after a RNA (RAN-based Notification Area) update, but does not need to first transit to the connected state. In this case, although a network device only performs reconfiguration on the terminal and does not perform state transition on the terminal, because a connection between a core network side and an RNA side is transferred, the network device that controls the terminal to stay in the inactive state is also referred to as an old network device.

(3) New network device: It is a network device that corresponds to an old network device and is a network device that currently can serve a terminal. There may be downlink synchronization between the terminal and at least one cell included in the new network device. The terminal receives a broadcast signal from the new network device and interacts with a network through the new network device.

(4) Terminal: It is a device that has a wireless transceiver function and can interact with a network device, and may be deployed on land, including an indoor or outdoor device, a hand-held device, a wearable device, or an in-vehicle device; or may be deployed on a water surface (for example, a ship); or may be deployed in the air (for example, an airplane, a balloon, or a satellite). The terminal may be a mobile phone, a tablet computer (Pad), a computer that has a wireless transceiver function, a virtual reality (VR) terminal device, an augmented reality (AR) terminal device, a wireless terminal in industrial control, a wireless terminal in self driving, a wireless terminal in remote medical treatment, a wireless terminal in a smart grid, a wireless terminal in transportation safety, a wireless terminal in a smart city, a wireless terminal in a smart home, or the like. An application scenario is not limited in the embodiments of this application. The terminal may be a device that can communicate with a network device. Sometimes UE may be referred to as a terminal device, an access terminal device, user equipment (UE), a UE unit, a UE station, a mobile station, a mobile station, a remote station, a remote terminal device, a mobile device, a UE terminal device, a wireless communications device, a UE agent, a UE apparatus, or the like.

(5) Interaction: Interaction in this application is a process during which two parties transfer information to each other. The information transferred herein may be the same or different. For example, two parties in interaction are a network device 1 and a network device 2, or a network device and UE. The network device 1 may request the network device 2 to provide information, and then the network device 2 provides the information requested by the network device 1 to the network device 1. Certainly, the network device 1 and the network device 2 may request each other to provide information. Interaction between a network device and UE is similar to the interaction between the foregoing network devices. Details are not described herein again. The information requested herein may be the same or different.

(6) Deactivated state: It may be referred to as an inactive state, or may be referred to as a radio resource control (RRC) inactive state, and is a communication state newly defined in 5G. The communication state can be considered as an independent communication state (an independent state other than an RRC connected (Connected/Active) state and an RRC idle state), or may be understood as a communication sub-state of the connected state or idle state. In this application, the inactive state may be considered as an independent communication state. A terminal in the inactive state may have the following characteristics: (A) Context information of the terminal at an access stratum (AS) is kept both at a terminal side and at a radio access network (RAN) side, and an AS context (where the context is consistent with an RRC connected state context or a part of an RRC connected state context) of the terminal may be stored in an old network device at the RAN side, or the context of the terminal may be transmitted by an old network device to another network device for storage; (B) When the terminal transits from the inactive state to the RRC connected state, a link between an old network device and a core network control plane network element does not need to be reactivated, for example, a link between a base station side and a core network side does not need to be reactivated; and (C) Mobility of the terminal is implemented through cell reselection instead of handover.

(7) RNA: It includes one or more cells. If a plurality of cells are included, the plurality of cells belong to a same network device, or belong to different network devices. The different network devices may be network devices of a same RAT or network devices of different RATs. For example, the network device may be an eNB in a 4.5G network or a gNB in a 5G network. When a terminal in the inactive state moves within an RNA, a network may not be notified, but cell reselection is performed merely based on mobility of the terminal and a periodic RNA update is also performed. When the terminal in the inactive state moves to a cell outside the RNA, the network needs to be notified and a RNA update is performed. The RNA update is similar to a tracking area update (TAU) in a long term evolution (LTE) network. A representation manner of the RNA information includes one or a combination of the following information:

(a) Radio access network paging area (RPA) information: The RPA information can uniquely identify, within a specific scope, an RPA to which a cell belongs, and the cell can notify, by broadcasting the RPA information, a terminal of information about the RPA to which the cell belongs. The RPA information may be an RPA code, to be specific, a set of codes similar to a TAC. Alternatively, the RPA information may be an RPA identifier (RPA ID). For example, the RPA ID may be expressed in a form of RPAC+PLMN. In other words, the RPA ID can indicate both an RPAC and a PLMN of the cell. Alternatively, the RPA ID may be expressed in a form of RPAC+TAI. In other words, the RPA ID can indicate both an RPAC and a TAI of the cell. Certainly, the RPA may be expressed in another form. A plurality of cells may broadcast same RPA information or different RPA information. If a plurality of cells broadcast same RPA information, it indicates that these cells belong to a same RPA. On the contrary, it indicates that these cells belong to different RPAs.

(b) Cell identifier: The cell identifier can uniquely identify a cell within a specific scope, and may be a physical cell identifier or a cell global identity (CGI). Certainly, the cell identifier may be expressed in another form.

(c) Network device identifier: The network device identifier can uniquely identify a network device within a specific scope, for example, may be a global base station identification or another identifier.

(d) Tracking area information or registration area information: The tracking area information or the registration area information can uniquely identify a tracking area or a registration area within a specific scope. For example, the tracking area information may be a tracking area identifier (TAI) or tracking area code (TAC); and the registration area information may be a registration area identifier (RAI) or registration area code (RAC).

It may be understood that, the RNA information may be expressed in another form, and this is not specifically limited in this application.

(8) Periodic RNA update: Usually, a network side configures a timer for a terminal. If the timer expires, the terminal initiates a periodic RNA update process, to notify the network side that the terminal currently does not leave a previously configured RNA. In a process of counting a quantity of periodic RNA updates, there is usually no data transmission process. That there is no data transmission process herein may be understood as that there is no uplink data packet transmission or no downlink data packet transmission. Certainly, it should be understood that whether there is data transmission is not limited in this application. For example, a terminal in the inactive state may transmit a small data packet without needing state transition.

(9) Identification information of a terminal: The identifier can uniquely identify an inactive terminal within a scope of an RNA. For example, the identifier may be a Resume ID, or another identification method may be used. Usually, the identifier of the inactive terminal can also indicate information about an old gNB, for example, indicating an identifier of an old gNB. Certainly, it should be understood that whether the identification information of the terminal can indicate information about an old gNB is not limited in this application. For example, an identifier of an inactive terminal in an inter-RAT network device cannot indicate information about an old gNB.

(10) State transition: After a new inactive state is introduced, there are the following state transition scenarios: transition from the connected state to the inactive state, transition from the connected state to the idle state, transition from the inactive state to the idle state, transition from the idle state to the connected state, and transition from the inactive state to the connected state. A terminal in the inactive state inevitably performs a RNA update and communication state transition. Usually, when a terminal in the inactive state transfers from an old network device to another new network device and needs to interact (for example, a RNA update and data transmission) with a network, the new transferred-to serving network device reallocates an RNA to the terminal in the inactive state; and the terminal in the inactive state first transits to the connected state, and then transits to the inactive state again if there is no data transmission. However, in an actual communication scenario, the new network device does not need to reallocate an RNA and the terminal in the inactive state also does not need to perform state transition in most cases. For example, after transferring to the new serving network device, the terminal still moves within an original RNA, and the new network device does not need to reallocate an RNA. For another example, after the terminal in the inactive state performs a RNA update, if there is no data transmission, the terminal does not need to transit to the connected state.

(11) The term "a plurality of" means two or more than two. The term "and/or" describes an association relationship between associated objects and represents that three relationships may exist. For example, A and/or B may represent the following three cases: Only A exists, both A and B exist, and only B exists. The character "/" generally indicates an "or" relationship between the associated objects.

(12) Nouns "network" and "system" are often used interchangeably, but a person skilled in the art can understand their meanings. The words "information (information)", "signal (signal)", "message", and "channel" sometimes may be used interchangeably. It should be noted that, when a difference thereof is not emphasized, a meaning to be expressed thereof is consistent. The words "of", "relevant" and "corresponding" sometimes may be used interchangeably. It should be noted that, when a difference thereof is not emphasized, a meaning to be expressed thereof is consistent.

The following describes technical solutions of this application with reference to the accompanying drawings.

FIG. 1 is a schematic diagram of a network architecture in a scenario to which this application is applicable. A communications system shown in FIG. 1 includes a terminal, network devices, and a core network. The network devices include a first network device, a second network device, a third network device, where the first network device may be a new network device (for example, a new gNB), and the second network device may be an old network device (old gNB). The first network device and the second network device belong to a same radio access type, and a radio access type of the third network device is different from that of the first network device and the second network device. For example, the first network device and the second network device may be understood as network devices (gNB) of 5G. The third network device may be understood as a network device (eNB) of 4G or 4.5G. The third network device can be connected to an evolved universal terrestrial radio access network (E-UTRAN) network device of a 5G core network, and can support setting of the terminal to an inactive state or a similar state. The core network may include an access and mobility management function (AMF). The AMF may be understood as a core network control plane function, and provides mobility management and access management functions for the terminal. In FIG. 1, if the terminal in a connected state stays within coverage of the second network device and does not perform data transmission within a set period of time, the second network device can set the terminal to the inactive state. The second network device setting the terminal from the connected state to the inactive state is a network device that last served the terminal in the connected state. The network device that last served the terminal in the connected state may be referred to as an old network device (or may be referred to as an anchor network device). The old network device keeps context information of the terminal. The terminal in the inactive state has mobility. If the terminal in the inactive state moves from the coverage of the second network device to coverage of the first network device, the terminal in the inactive state may use the first network device as a new serving network device. The terminal maintains downlink synchronization with the first network device or maintains synchronization with a cell of the first network device, receives a broadcast signal from the first network device, and can interact with the core network through the first network device. The first network device can perform data transmission or a RNA update for the terminal in the inactive state. The RNA update process may include a periodic RNA update, or may include a RNA update due to a location change. During the RNA update process, the first network device obtains information about an RNA recently accessed by the terminal, to more accurately allocate an RNA to the terminal, thereby reducing a quantity of RNA updates and signaling overheads. In a possible implementation, a network device can exchange in advance whether the network device itself or a cell included in the network device supports the inactive state. When an RNA is allocated to the terminal, this factor may also be taken into account so that the allocation is more accurate. In addition, the obtained information about the RNA recently accessed by the terminal and obtained information about whether the inactive state is supported can be combined to further improve accuracy of the allocation.

Figure 2:
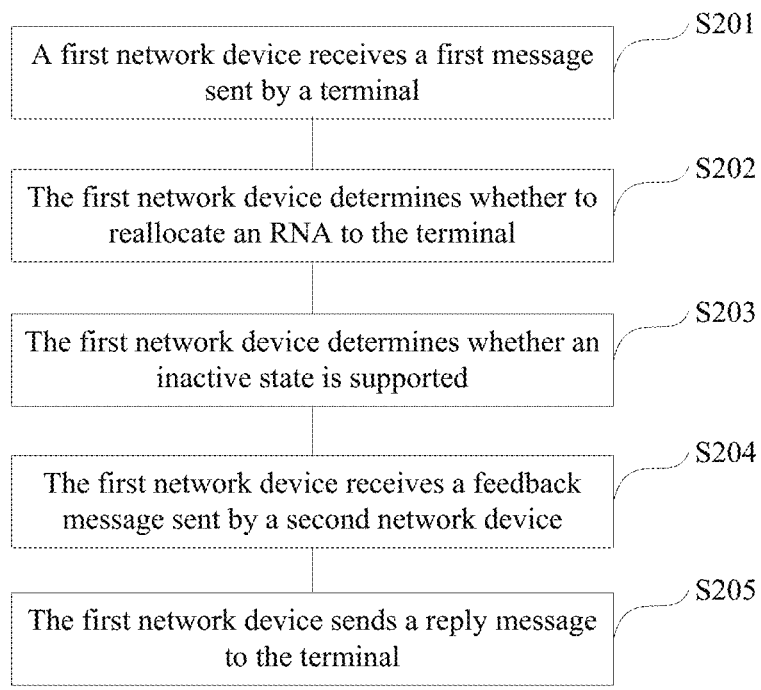
FIG. 2 is a flowchart of an RNA allocation method according to this application.

FIG. 2 is a flowchart of an RNA allocation method according to this application. As shown in FIG. 2:

S201. A first network device receives a first message sent by a terminal, where the first message carries information about an RNA recently accessed by the terminal. The RNA information is used to indicate at least one cell or at least one network device that is accessed by the terminal before the terminal is moved to the first network device. A representation manner of the RNA information includes one or a combination of the following information: radio access network paging area information, cell identification information, base station identification information, tracking area information, and registration area information. If the information about the RNA recently accessed by the terminal is represented in a form of a cell identifier or a cell identifier list, cells corresponding to these cell identifiers may include only a cell that served the terminal, that is, the terminal exchanged signaling or performed data transmission with a network side; or may include only a cell that did not serve the terminal, that is, the terminal only read broadcast information of the cell but there was not any signaling or data exchange; or may include the foregoing two kinds of cells. If the information about the RNA recently accessed by the terminal is represented in a form of RPA information or an RPA information list, at least one cell within an RPA scope corresponding to the RPA information is a cell that served the terminal, that is, the terminal exchanged signaling or performed data transmission with the network side; or at least one cell within an RPA scope corresponding to the RPA information is a cell that did not serve the terminal, but the terminal selected and camped on (camp on) this cell through cell reselection, that is, the terminal only read broadcast information of the cell but there was not any signaling or data exchange; or at least two cells within an RPA scope corresponding to the RPA information include the foregoing two kinds of cells. If the information about the RNA recently accessed by the terminal is represented in a form of a network device identifier or a network device identifier list, at least one cell included by the network devices corresponding to these network device identifiers is a cell that served the terminal, that is, the terminal exchanged signaling or performed data transmission with the network side; or at least one cell included by the network devices corresponding to these network device identifiers is a cell that did not serve the terminal, but the terminal selected and camped on this cell through cell reselection, that is, the terminal only read broadcast information of the cell but there was not any signaling or data exchange; or at least two cells included by the network devices corresponding to the network device identifiers include the foregoing two kinds of cells. If the information about the RNA recently accessed by the terminal is represented in a form of TA/RA information or a TA/RA information list, at least one cell within a TA/RA scope corresponding to the TA/RA information is a cell that served the terminal, that is, the terminal exchanged signaling or performed data transmission with the network side; or at least one cell within a TA/RA scope corresponding to the TA/RA information is a cell that did not serve the terminal, but the terminal selected and camped on (camp on) this cell through cell reselection, that is, the terminal only read broadcast information of the cell but there was not any signaling or data exchange; or at least two cells within a TA/RA scope corresponding to the TA/RA information include the foregoing two kinds of cells. The first message is used by the terminal to: request to resume an RRC connection, or instruct the network side to perform a RNA update, or indicate that uplink data or signaling needs to be transmitted, or indicate that a paging message from the network side is received and uplink signaling needs to be transmitted. For example, the first message may be an RRC connection resume request in S1301 in Embodiment 3 of this application.

Optionally, the first message further carries stay duration of the terminal, and the stay duration is duration of staying in the at least one cell or the at least one network device that is indicated by the information about the RNA recently accessed by the terminal. If the RNA information is in a form of at least one cell identifier, the stay duration means duration of staying in a cell corresponding to the cell identifier. The duration of staying means duration from accessing the cell through cell reselection or handover to accessing another cell through cell reselection or handover. If the terminal was once served by a specific cell, duration of being served by the cell may be further carried. If the RNA information is in a form of at least one piece of RPA information, the stay duration means duration of staying by the terminal within a scope of an RPA corresponding to the RPA information. The duration of staying means duration from accessing a specific cell of the RPA through cell reselection or handover to accessing another cell that does not belong to the RPA through cell reselection or handover. If the terminal was once served by at least one cell within the RPA, duration of being served by the RPA may be further carried. If the RNA information is in a form of at least one network device identifier, the stay duration means duration of staying by the terminal within coverage of a network device corresponding to the network device identifier. The duration of staying means duration from accessing a specific cell of the network device through cell reselection or handover to accessing another cell that does not belong to the network device through cell reselection or handover. If the terminal was once served by at least one cell within the network device, duration of being served by the network device may be further carried. If the RNA information is in a form of at least one piece of RA/TA information, the stay duration means duration of staying by the terminal within a scope of an RA/TA corresponding to the RA/TA information. The duration of staying means duration from accessing a specific cell of the RA/TA through cell reselection or handover to accessing another cell that does not belong to the RA/TA through cell reselection or handover. If the terminal was once served by at least one cell within the RA/TA, duration of being served by the RA/TA may be further carried. In this way, the message carries the stay duration of the terminal, to further enrich a moving track of the terminal, so that a network side can make a more accurate judgment and then the network side can more accurately allocate a new RNA. If the RNA information is in a manner of a combination of a cell identifier, RPA information, a network device identifier, and RA/TA information, the stay duration may also be a combination of the foregoing four manners.

S205. The first network device sends a reply message for the first message to the terminal, where the reply message carries information about an RNA allocated by the first network device to the terminal. The RNA allocated by the first network device to the terminal may be carried, by using RNA information, in a message to be sent to the terminal. The first network device allocates an RNA to the terminal based on the received information about the RNA recently accessed by the terminal. The RNA allocated by the first network device to the terminal may be the same as or different from an RNA allocated by a second network device to the terminal (if same, the RNA information may not be carried in the reply message for the first message). During the allocation, an RNA may be allocated to the terminal based on the information (which may alternatively be understood as a moving track of the terminal) about the RNA recently accessed by the terminal, so that the RNA allocation is more appropriate to reduce aperiodic RNA updates. The reply message may be an RRC Connection Suspend message, an RRC Connection Reconfiguration message, an RRC Connection Resume message, an RRC Connection Release message, or an RRC Connection Reject message; and certainly may be another RRC message and is not limited thereto.

Optionally, after S201 and before S205, the method further includes: S202. The first network device determines, based on the information about the RNA recently accessed by the terminal, whether to reallocate an RNA to the terminal. If an RNA needs to be reallocated, information about the reallocated RNA is carried in S205. If an RNA does not need to be reallocated, the RNA information may not be carried in S205. Optionally, S202 may further be: The network device determines, based on one or more of the following information, whether to reallocate an RNA to the terminal, where the information includes: the information about the RNA recently accessed by the terminal, the stay duration of the terminal, and whether an inactive state is supported.

Optionally, after S201 and before S205, the method further includes: S203. The first network device determines whether an inactive state is supported. Whether the inactive state is supported may include: whether the first network device supports the inactive state, whether a cell in which the terminal is currently located supports the inactive state, whether a PLMN corresponding to a cell in which the terminal is currently located supports the inactive state, and whether the first network device, the cell, or the PLMN supports the inactive state. The first network device can obtain, in advance through interaction with another network device or in another manner, information about whether the inactive state is supported. Optionally, when the method includes S202, S203 may be: The first network device allocates the RNA to the terminal based on the information about the RNA recently accessed by the terminal and whether the inactive state is supported.

Optionally, after S201 and before S205, the method further includes: S204. The first network device receives a feedback message sent by a second network device, where the feedback message carries a quantity of periodic RNA updates of the terminal. The quantity of periodic RNA updates includes a quantity of periodic RNA updates already performed after the terminal transits from a connected state to the inactive state. The terminal is moved from a fourth network device to the second network device (where the fourth network device may be a same device as the second network device or a same device as a third network device, and this is not limited herein). If the fourth network device sets the terminal to the inactive state and the second network device still sets the terminal to the inactive state, in this case, the quantity of periodic RNA updates may include a quantity previously counted, that is, the second network device continues to perform counting on a basis of a quantity of periodic RNA updates counted by the fourth network device. For example, the fourth network device sets the terminal from the connected state to the inactive state, the terminal is still in the inactive state after moving to the second network device, and the second network device performs a periodic RNA update on the terminal; in this case, a quantity of periodic RNA updates needs to be counted again, where this quantity is a value obtained after the quantity of periodic RNA updates counted by the fourth network device is incremented by one. On this basis, if the terminal is moved to the first network device, the first network device still sets the terminal to the inactive state, and the first network device performs a RNA update on the terminal, a quantity of periodic RNA updates needs to be counted again, where this quantity is a value obtained after the quantity of periodic RNA updates counted by the fourth network device and the second network device is further incremented by one. In conclusion, the counted quantity is a quantity of periodic RNA updates performed in total after the terminal transits from the connected state to the inactive state, regardless of how many network devices or cells are accessed by the terminal. If the terminal has performed a plurality of periodic RNA updates but there is no data transmission, it indicates that the terminal is not so active. In some cases, a context of the terminal may be released. For example, these cases may include: when a network is congested, or after the quantity of periodic RNA updates reaches a preset threshold. If the terminal is set to or stays in the inactive state within the first network device, the first network device may continue to perform counting on a basis of the quantity of periodic RNA updates counted by the second network device. If a new gNB sets the terminal to the connected state during this process, the first network device may reset the quantity of periodic RNA updates (that is, reset the quantity to 0). Certainly, in this case the quantity may not be reset, depending on an actual situation, or the quantity of periodic RNA updates is cleared. This is not limited in this embodiment of this application. A network device can determine activeness of the terminal based on the quantity of periodic RNA updates of the terminal, to more accurately determine to set the terminal to a particular state, thereby reducing state transitions and reducing signaling overheads and power consumption.

Optionally, the method in this application may further include: receiving, by the first network device, RNA information of the second network device sent by the second network device. For details, refer to description about RNA information exchange in Embodiment 2. Details are not described herein again.

Optionally, the method in this application may further include: receiving, by the first network device, information that is sent by the second network device and that indicates whether the inactive state is supported. For details, refer to description about exchange of information whether an inactive state is supported in Embodiment 1. Details are not described herein again.

It should be understood that the foregoing text and the description about steps S201, S202, S203, S204, S205, or the like in FIG. 2 are merely examples. It should be understood that there may be another execution sequence between these steps. This is not limited in this application.

Figure 3:
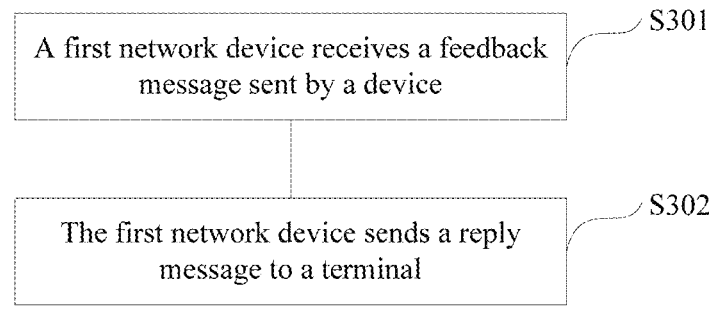
FIG. 3 is a flowchart of a method for setting a state of a terminal according to this application.

FIG. 3 is a flowchart of a method for setting a state of a terminal according to this application. As shown in FIG. 3, the method includes the following steps.

S301. A first network device receives a feedback message sent by a device, where the feedback message carries a quantity of periodic RNA updates of the terminal, and the quantity of periodic RNA updates includes a quantity of periodic RNA updates already performed after the terminal transits from a connected state to an inactive state. For an understanding of the quantity of periodic RNA updates, refer to the description about the quantity of periodic RNA updates in S203. Details are not described herein again.

S302. The first network device sends a reply message to the terminal, where the reply message is used to instruct to set the terminal to a particular state.

Optionally, the device includes a second network device and/or the terminal. When the device includes a second network device, reference may be made to description of Embodiment 3 in this application for a specific implementation. Details are not described herein again. If the device includes the terminal, reference may be made to description of Embodiment 4 in this application for a specific implementation. Details are not described herein again.

The quantity of periodic RNA updates can reflect activeness of the terminal. A network device determines, in combination with this parameter, to set the terminal to a particular state, so that allocation is more accurate, thereby reducing state transitions and reducing signaling overheads and power consumption.

The following description is made mainly by using a 5G network scenario in a wireless communications network as an example. It should be noted that, the solutions in the embodiments of this application may also be applied to another wireless communications network, and a corresponding name may be replaced by a name of a corresponding function in the another wireless communications network.

Embodiment 1

Figure 4:
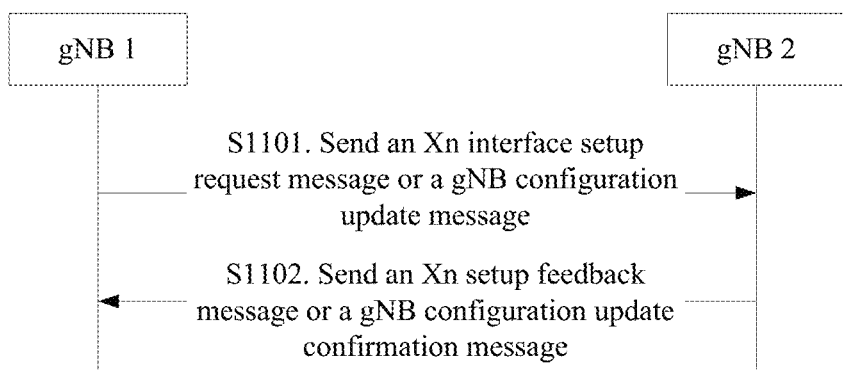
FIG. 4 is a schematic flowchart of exchanging, through Xn interface setup, information about whether an inactive state is supported according to this application.

It is possible that, not all cells corresponding to (or included in) all 5G base stations or one 5G base station or not all cells corresponding to (or included in) all 4.5G base stations (eLTE eNB) or one 4.5G base station support an inactive state; therefore, base stations (and/or cells) need to exchange information about whether the inactive state is supported with each other. The exchange may be performed during an interface setup process, for example, Xn interface setup (that is, interface setup between two 5G base stations), X2 interface setup (that is, interface setup between two 4.5G base stations), or Xx interface setup (that is, interface setup between a 5G base station and a 4.5G base station). Alternatively, the exchange may be performed during a base station update process, for example, a 5G base station (gNB) configuration update. The following describes, by using Xn interface setup as an example, how base stations (and/or cells) exchange the information about whether the inactive state is supported with each other. FIG. 4 is a schematic flowchart of exchanging, through Xn interface setup, information about whether an inactive state is supported according to this application. The following is shown in FIG. 4.

S1101. A gNB 1 sends an Xn interface setup request message or a gNB configuration update message to a gNB 2. The message includes indication information, and the indication information indicates whether the gNB 1 supports the inactive state, whether each cell included in the gNB 1 supports the inactive state, or whether a public land mobile network (Public Land Mobile Network, PLMN) corresponding to each cell in the gNB 1 supports the inactive state. For example, the indication information may be in a form shown in Table 1, Table 2, or Table 3 below.

TABLE 1

| Base station granularity | |
|---|---|
| Information element IE/Group Name | Semantics description |
| Message Type | Message type |
| gNB ID | Base station identifier, which may be a Global gNB ID or another identifier |
| Inactive Configuration | Indicates whether a gNB supports an inactive state |
| Served Cells | Served cells list |
| >Served Cell Information | Identifier of a cell included in a base station |

TABLE 2

| Cell granularity | |
|---|---|
| IE/Group Name | Semantics description |
| Cell ID | Cell identifier, which may be a PCI, a CGI, or another identifier |

TABLE 2-continued

| Cell granularity | |
|---|---|
| IE/Group Name | Semantics description |
| Inactive Configuration | Indicates whether the cell supports an inactive state |
| Broadcast PLMNs | Broadcast PLMNs list |
| >PLMN Identity | PLMN identifier |

TABLE 3

| PLMN granularity | |
|---|---|
| IE/Group Name | Semantics description |
| Cell ID | Cell identifier, which may be a PCI, a CGI, or another identifier |
| Broadcast PLMNs | Broadcast PLMNs list |
| >PLMN Identity | PLMN identifier |
| >Inactive Configuration | Indicates whether a PLMN corresponding to the cell supports an inactive state |

S1102. The gNB 2 sends an Xn setup feedback message or a gNB configuration update confirmation message to the gNB 1. Optionally, the message may also include indication information, and the indication information is used to indicate whether the gNB 2 supports the inactive state, whether each cell included in the gNB 2 supports the inactive state, or whether a PLMN corresponding to each cell in the gNB 2 supports the inactive state. The indication information may be represented in a form in S1101. For details, refer to the description in S1101. Details are not described herein again.

Embodiment 2

Figure 5:
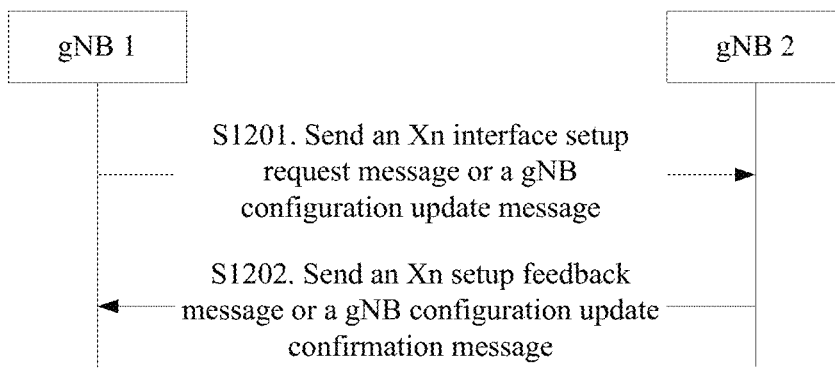
FIG. 5 is a schematic flowchart of exchanging RNA information through Xn interface setup according to this application.

Base stations need to exchange RPA information with each other, so that an RNA can be more accurately allocated to a terminal as required. Similar to the exchange of information about whether an inactive state is supported, the RPA information can be exchanged during a process of setting up an interface between base stations or during a base station update process. For details, refer to the foregoing description about the exchange of the information about whether the inactive state is supported. Details are not described herein again. The following describes, by using Xn interface setup as an example, how base stations exchange RPA information with each other. It may be understood that how base stations exchange a cell identifier with each other is similar to how base stations exchange RPA information with each other. Details are not described herein again. FIG. 5 is a schematic flowchart of exchanging RNA information through Xn interface setup according to this application. As shown in FIG. 5:

S1201 A gNB 1 sends an Xn interface setup request message or a gNB configuration update message to a gNB 2. The request includes RPA information of the gNB 1. A form of the RPA information may include the following.

Type 1: If the RPA information is for all cells of the gNB 1, the RPA information may be an RPA code (RPA code, RPAC) corresponding to all cells of the gNB 1. The RPAC is information about a string of bits, used to identify a unique RPA (which is similar to a function of a TAC for a TA). The RPA information may alternatively be an RPA ID. The RPA ID may further indicate a PLMN (that is, the RPA ID can indicate a PLMN and an RPAC), and the RPA ID may further indicate a TA (that is, the RPA ID can indicate a PLMN, an RPAC, and a TAC, or the RPA ID can indicate an RPAC and a TAC). It should be understood that if the gNB 1 supports a plurality of PLMNs or a plurality of TAs, the RPA information may be in a form of an RPA ID list, for example, may be represented in a form shown in Table 4 below.

TABLE 4

Example of an Xn interface setup request message

| IE/Group Name | Semantics description |
|---|---|
| Message Type | Message type |
| gNB ID | Base station identifier, which may be a Global gNB ID or another identifier |
| RPAC or RPAI (list) | RPA information corresponding to the base station |
| Served Cells | Served cells list |
| >Served Cell Information | Information about a cell included in the base station, including a cell identifier |

Type 2: If the RPA information is for each cell included in the gNB 1, the RPA information may be an RPAC corresponding to the cell. The RPAC may be similar to the foregoing RPAC in Type 1, and details are not described herein again. For example, the RPAC may be represented in a form shown in Table 5 below.

TABLE 5

Example of Served Cell Information

| IE/Group Name | Semantics description |
|---|---|
| Cell ID | Cell identifier, which may be a PCI, a CGI, or another identifier |
| RPAC | RPA Code |
| Broadcast PLMNs | Broadcast PLMNs list |
| >PLMN Identity | PLMN identifier |

Type 3: If the RPA information is for each cell included in the gNB 1, the RPA information may be an RPA ID corresponding to the cell. The RPA ID may be similar to the RPA ID in Type 1, and details are not described herein again. For example, the RPA ID can be represented as the form shown in the following Table 6.

TABLE 6

Example of Served Cell Information

| IE/Group Name | Semantics description |
|---|---|
| Cell ID | Cell identifier, which may be a PCI, a CGI, or another identifier |
| RPA ID (list) | RPA Identity/Identifier |
| Broadcast PLMNs | Broadcast PLMNs list |
| >PLMN Identity | PLMN identifier |

Type 4: If the RPA information is for each PLMN corresponding to each cell included in the gNB 1, the RPA information may be an RPA ID. The RPA ID may be similar to the RPA ID in Type 1, and details are not described herein again. For example, the RPA ID may be represented in a form shown in Table 7 below.

TABLE 7

Example of Served Cell Information

| IE/Group Name | Semantics description |
|---|---|
| Cell ID | Cell identifier, which may be a PCI, a CGI, or another identifier |
| Broadcast PLMNs | Broadcast PLMNs list |
| >PLMN Identity | PLMN identifier |
| >RPAC or RPA ID (list) | RPA Code or RPA Identity/Identifier |

It should be understood that the RPA information may further include another form. This is not limited in this application.

S1202. The gNB 2 sends an Xn setup feedback message or a gNB configuration update confirmation message to the gNB 1. Optionally, the message may also include RNA information of the gNB 2. The RNA information may be represented in a form in S1201. For details, refer to the description in S1201. Details are not described herein again.

The following describes in detail exchange that may occur when a terminal is moved from an old gNB to a new gNB.

Embodiment 3

Figure 6:
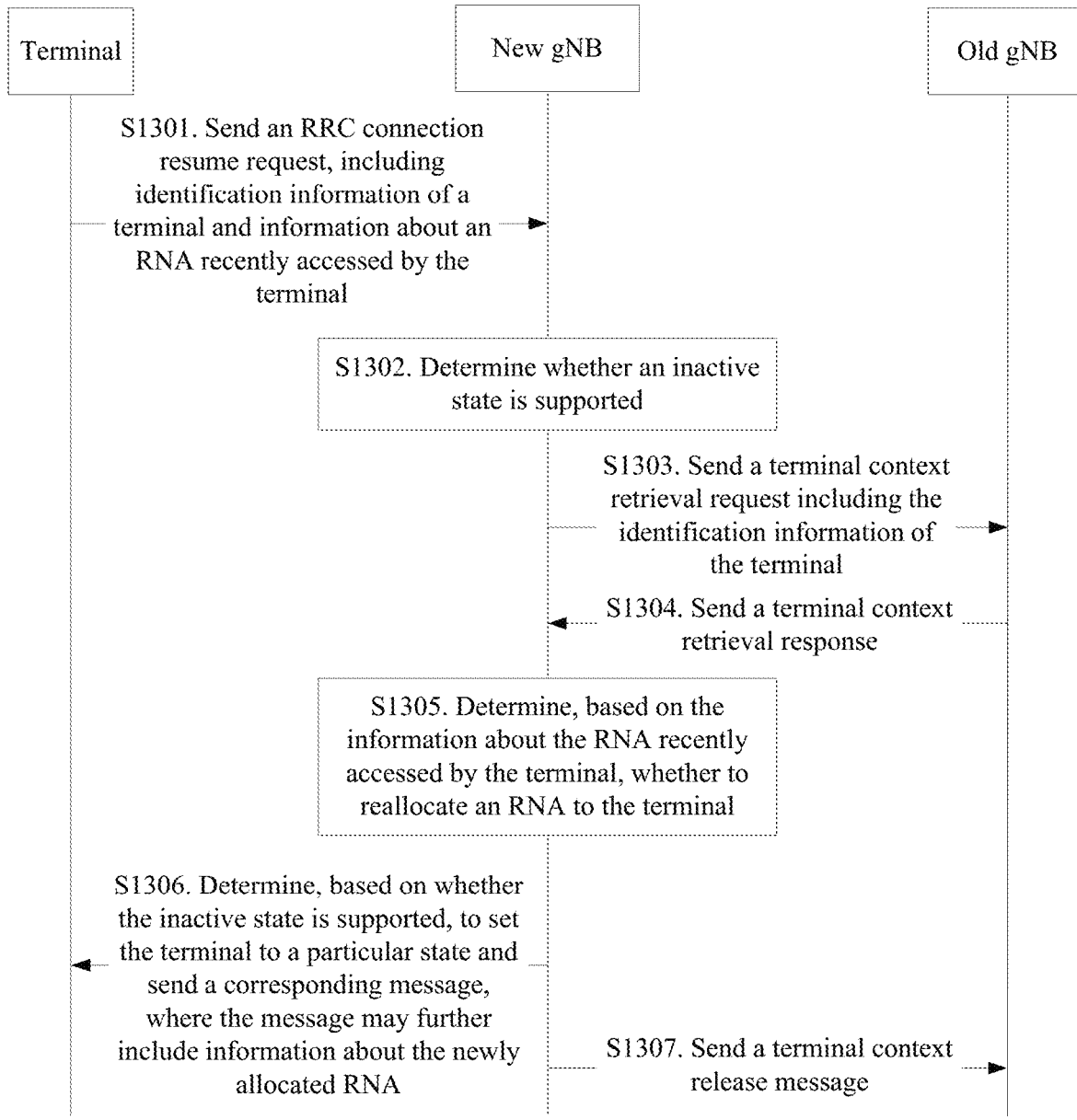
FIG. 6 is a schematic flowchart of updating an RNA according to this application.

FIG. 6 is a schematic flowchart of updating an RNA according to this application. As shown in FIG. 6:

S1301. A terminal sends an RRC connection resume request to a new gNB, where the request includes identification information of the terminal (for example, Resume ID information) and information about an RNA recently accessed by the terminal. The RNA information can enable the new gNB to more accurately allocate an RNA to the terminal. Optionally, the RRC connection resume request further carries stay duration of the terminal, and the stay duration is duration of staying in the at least one cell or at least one network device that is indicated by the information about the RNA recently accessed by the terminal.

Optionally, in S1302, the new gNB determines whether the new gNB supports an inactive state, whether a cell in which the terminal is currently located supports the inactive state, or whether a PLMN corresponding to a cell in which the terminal is currently located supports the inactive state. If the inactive state is not supported, S1305 continues and the terminal is set to an idle state.

Optionally, in S1303, the new gNB sends a terminal context retrieval request (which may be a retrieve UE context request) to an old gNB, where the request includes the identification information of the terminal.

Optionally, in S1304, the old gNB sends a terminal context retrieval response (may be a retrieve UE context response) to the new gNB, where the terminal context retrieval response includes a security context of the terminal. Optionally, the terminal context retrieval response may further carry a quantity of periodic RNA updates already performed by the terminal. The quantity of periodic RNA updates may be in S1306. The new gNB determines to send particular information to set the terminal to a particular state.

Optionally, in S1305, the new gNB determines, based on the information about the RNA recently accessed by the terminal, whether to reallocate an RNA to the terminal. If the new gNB determines to reallocate an RNA, a corresponding message sent in S1306 may include information about the newly allocated RNA. If the new gNB determines not to reallocate an RNA, a corresponding message sent in S1306 may not include information about the newly allocated RNA. In this step, alternatively the new gNB may comprehensively determine, by taking into account one or more of terminal context information, the information about the RNA recently accessed by the terminal, and the stay duration of the terminal, whether to reallocate an RNA to the terminal.

S1306. The new gNB determines, based on whether the inactive state is supported and an objective of the RRC connection resume request sent by the terminal, to set the terminal to a particular state, and sends a corresponding message, where the message may further include the information about the newly allocated RNA. Optionally, the new gNB may further determine, by taking the quantity of periodic RNA updates into account, to set the terminal to a particular state.

Specifically, if a quantity of periodic RNA updates of the new gNB reaches a specific threshold, or the new gNB does not support the inactive state, the new gNB sends RRC Connection Reject or RRC Connection Release to the terminal to set the terminal to the idle state. If the objective of the RRC connection resume request sent by the terminal is merely to perform a RNA update, and the new gNB supports the inactive state, the new gNB sends one of the following messages to the terminal to set the terminal to the inactive state: RRC Connection Reject, RRC Connection Reconfiguration, RRC Connection Resume, RRC Connection Release, and RRC Connection Suspend. When the new gNB sends messages except the RRC Connection Suspend message, these messages need to carry indication information that is used to instruct to set the terminal to the inactive state. It should be understood that certainly the terminal can be set to the inactive state by using another message. This is not limited in this application. If the objective of the RRC connection resume request sent by the terminal is to perform data transmission, the new gNB can set the terminal to a connected state by using RRC Connection Resume.

Optionally, in S1307, the new gNB sends a terminal context release message (UE context release) to the old gNB. Optionally, the message includes the identification information of the terminal.

Embodiment 4

Figure 7:
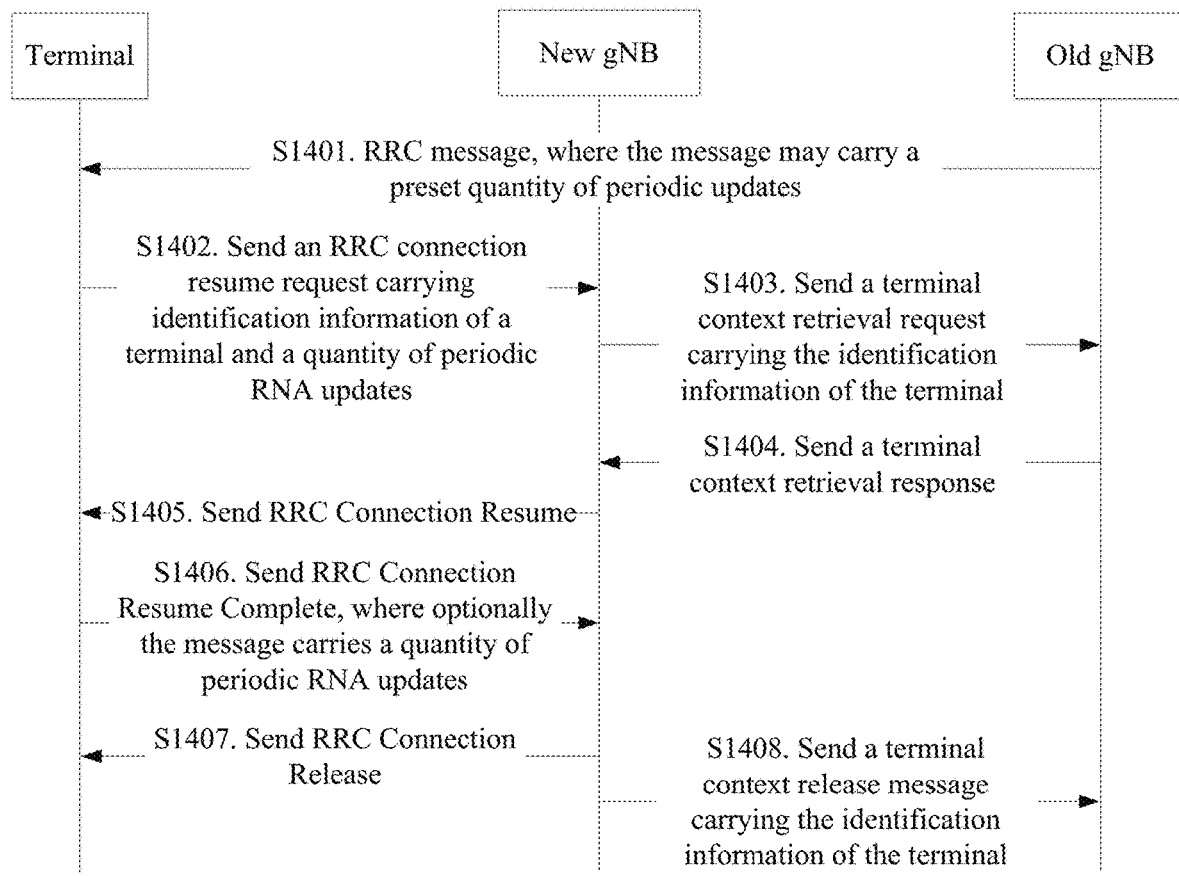
FIG. 7 is a schematic flowchart of updating an RNA according to this application.

FIG. 7 is a schematic flowchart of updating an RNA according to this application. A difference between Embodiment 4 and Embodiment 3 mainly lies in that a quantity of periodic RNA updates counted by a terminal is carried in an RRC connection resume complete message or an RRC connection resume request message. As shown in FIG. 7.

Optionally, in S1401, an old gNB sends an RRC message (for example, an RRC connection reconfiguration message or an RRC connection release message) to UE, where the message may carry a preset quantity of periodic updates. If a quantity of periodic RNA updates counted by the terminal is greater than or equal to this preset quantity, optionally, a quantity of periodic RNA updates in the following steps S1402 and S1406 may be replaced with indication information. The indication information is used to indicate that the terminal wants to enter an idle state, and may further indicate that a reason why the terminal wants to enter the idle state is that the quantity of periodic updates is greater than or equal to the preset quantity of updates. It should be understood that one piece of indication information may be used to both indicate that the terminal wants to enter the idle state and indicate the reason why the terminal wants to enter the idle state is that the quantity of periodic updates is greater than or equal to the preset quantity of updates. Alternatively, two pieces of indication information may be used to respectively indicate that the terminal wants to enter the idle state and indicate the reason why the terminal wants to enter the idle state is that the quantity of periodic updates is greater than or equal to the preset quantity of updates.

S1402. The UE sends an RRC connection resume request to a new gNB, where the request includes identification information of the terminal. The message may further carry a quantity of periodic RNA updates. A function of the quantity of periodic RNA updates is similar to the description in Embodiment 3, and details are not described herein again.

S1403. The new gNB sends a terminal context retrieval request to the old gNB, where the request includes the identification information of the terminal.

S1404. The old gNB sends a terminal context retrieval response to the new gNB.

S1405. The new gNB sends RRC Connection Resume to the UE.

S1406. The UE sends RRC Connection Resume Complete to the new gNB.

Optionally, if a quantity of periodic RNA updates is not carried in S1402, the message in this step carries a quantity of periodic RNA updates. A function of the quantity of periodic RNA updates is similar to the description in Embodiment 3, and details are not described herein again.

S1407. The new gNB sends an RRC message to the UE to set the terminal to a connected state, or an idle state, or an inactive state. For the specific RRC message, refer to the description in step S1305, and details are not described herein again.

Optionally, in S1408, the new gNB sends a terminal context release message to the old gNB, where the message carries the identification information of the terminal.

Embodiment 5

Figure 8:
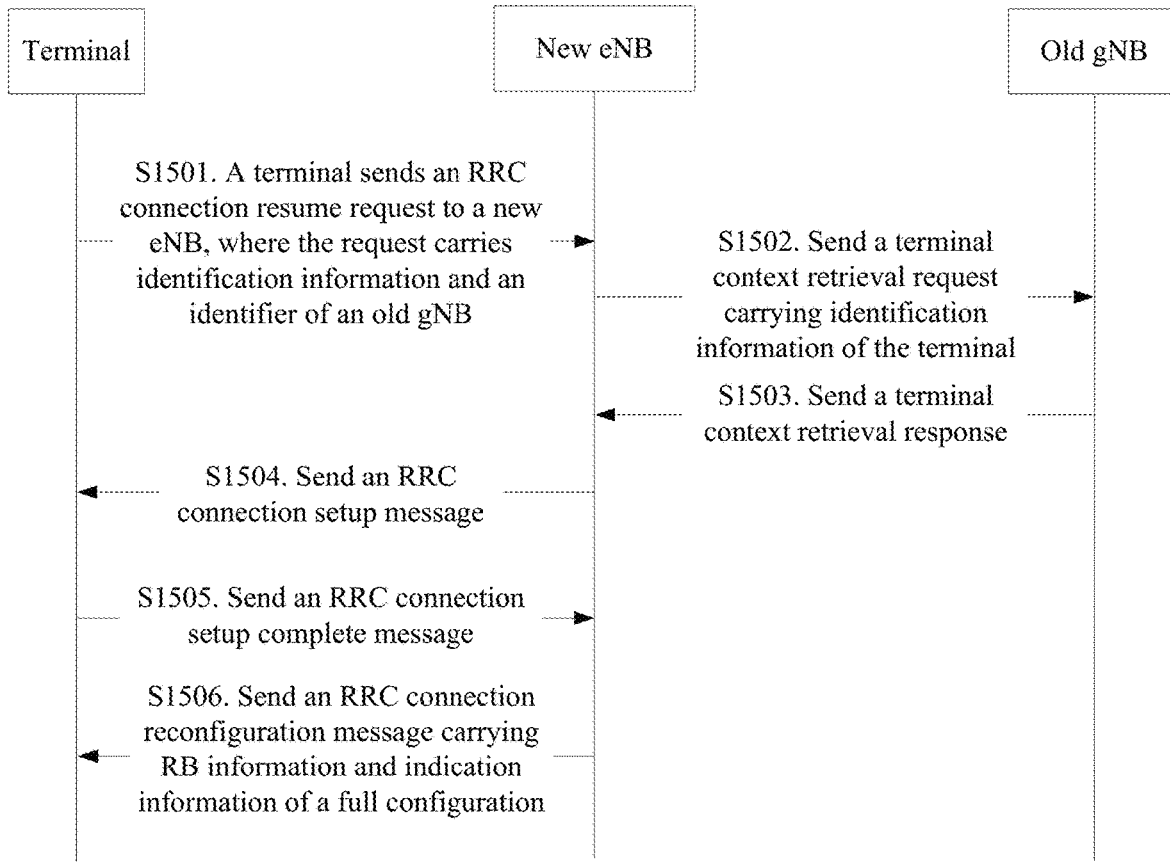
FIG. 8 is a schematic flowchart of cell reselection according to this application.

FIG. 8 is a schematic flowchart of cell reselection according to this application, where an interactive process of inter-RAT cell reselection is emphasized. As shown in FIG. 8:

S1501. A terminal sends an RRC connection resume request to a new eNB, where the request carries identification information (Resume ID). The identification information (Resume ID) is allocated by an old gNB (where optionally an ASN.1 code of the gNB may be used), and the old gNB and the new eNB do not belong to a same RAT; therefore, it is possible that the new eNB cannot correctly analyze the identification information (Resume ID). In other words, it is possible that the new eNB cannot learn the old gNB, that is, it is possible that the new eNB cannot learn a particular gNB on which a context of the terminal is kept. In this case, an identifier of the old gNB or an identifier of at least one cell of the old gNB needs to be carried, to indicate to the new eNB, a place where the context of the terminal is kept.

S1502 is the same as S1403, and S1503 is the same as S1404. For details, refer to the descriptions of S1403 and S1404. Details are not described herein again.

S1504. The new eNB sends an RRC connection setup message to the terminal. A reason for not sending an RRC connection resume message is that the RRC connection resume message is sent on an SRB 1. However, the new eNB cannot understand configuration information configured by the old gNB for an SRB 1 of the terminal, so that the new eNB does not know how the SRB 1 kept by the terminal is configured, for example, an RLC configuration (where an RLC configuration of a gNB is different from an RLC configuration of an eNB, for example, RLC in a gNB does not have an aggregation function); therefore, it is quite difficult to successfully transmit an RRC connection setup message on the SRB 1. Therefore, it is selected to send the RRC connection setup message to the terminal in the fourth step S1504. The connection setup message is sent on an SRB 0, and the message includes configuration information configured by the new eNB for the SRB 1 of the terminal. After the terminal receives the configuration of the SRB 1, a configuration previously kept is completely replaced.

S1505. The terminal sends an RRC connection setup complete message to the new eNB.

S1506. The new eNB sends an RRC connection reconfiguration message to the terminal. The reconfiguration message includes RB (Radio Bearer, radio bearer) information configured by the new eNB for the terminal, and the message further includes indication information of a full configuration. The new eNB cannot understand RB configuration information configured by the old gNB for the terminal (that is, cannot understand AS configuration information in a context of the terminal in step S1503); therefore, the new eNB cannot perform modification based on a previous configuration from the old gNB. For this reason, the new eNB has to perform RB configuration on the terminal based on only a situation of the new eNB and core network information in step S1503, for example, a session/flow that needs to be established and QoS information corresponding to the session/flow; and instructs the terminal to use the full configuration (where a full-configuration indication is carried in step S1506). The terminal completely deletes a previous configuration after receiving the full-configuration indication, and then performs RB configuration based on a configuration sent in step S1506 by the new eNB.

Figure 9:
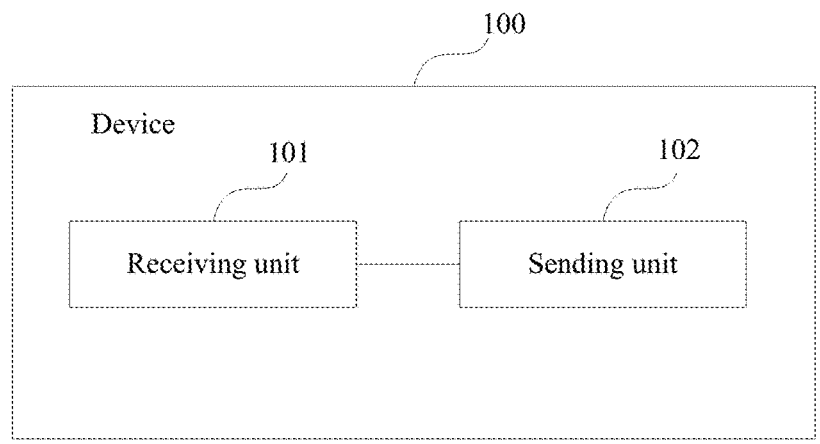
FIG. 9 is a schematic structural diagram of a device 100 according to this application.

The following performs division of functional units on the network device or terminal in this application in combination with one or more of the foregoing methods. For example, functional units may be divided to correspond to various functions, or two or more functions may be integrated into one unit. Some or all of the integrated units may be implemented by software, hardware, firmware, or any combination thereof. It should be noted that, unit division in this application is merely used as an example and is merely logical function division. In actual implementation, there may be another division manner. FIG. 9 is a schematic structural diagram of a device 100 according to this application. The device 100 may be applied to implement the second network device, the first network device, or the terminal in this application. As shown in FIG. 9, the device 100 includes a receiving unit 101 and a sending unit 102. When the device 100 is configured to implement a function of the first network device, the receiving unit 101 is configured to receive a first message sent by a terminal and the sending unit 102 is configured to send a reply message for the first message to the terminal. When the device 100 is configured to implement a function of the second network device, the sending unit 102 is configured to send RNA information of the second network device and/or information about whether an inactive state is supported. When the device 100 is configured to implement a function of the terminal, the sending unit 102 is configured to send a first message to a first network device and the receiving unit 101 is configured to receive a reply message sent by the first network device for the first message. It should be understood that, with reference to one or more of the foregoing methods, the first network device, the second network device and the terminal may further include more functional units to implement more functions, thereby achieving appropriate RNA allocation and reducing signaling overheads.

When the first network device, the second network device or the terminal is implemented in a form of hardware, for a concept, an explanation, a detailed description, a method, a procedure, or a step related to this application thereof, or the like, reference may be made to description of such content in the foregoing embodiments. In this application, the receiving unit may be implemented by using a communications interface, a receiver, a receiving circuit, or the like; and the sending unit may be implemented by a communications interface, a transmitter, a transmitting circuit, or the like. It should be understood that, functions of the receiving unit and the sending unit may alternatively be integrated and implemented by a communications interface, a transceiver, and a transceiver circuit, where the communications interface is a general name and may include one or more interfaces.

It should be understood that the foregoing description is merely a simplified example of the form of hardware. In actual application, the hardware implementing the second network device, the first network device, or the terminal is not limited to the foregoing structures, for example, may further include a processor, a memory, an antenna array, a duplexer, and a baseband processing part. The processor may be a central processing unit (CPU), a general purpose processor, a digital signal processor (DSP), an application-specific integrated circuit (ASIC), a field programmable gate array (FPGA), another programmable logical device, a hardware component, or any combination thereof. Alternatively, the processor may be a combination of processors implementing a computing function, for example, a combination of one or more microprocessors or a combination of a DSP and a microprocessor. The memory may be disposed in the processor or may exist alone. The duplexer is configured to implement an antenna array, and is configured to send a signal and receive a signal. The transmitter is configured to implement conversion between a radio frequency signal and a baseband signal. Usually the transmitter may include a power amplifier, a digital-to-analog converter, and a frequency converter. Usually the receiver may include a low noise amplifier, an analog-to-digital converter, and a frequency converter. Sometimes the receiver and the transmitter may be collectively referred to as a transceiver. The baseband processing part is configured to: implement processing of a sent signal or a received signal, such as layer mapping, precoding, modulation/demodulation, or coding/decoding; and respectively process a physical control channel, a physical data channel, a physical broadcast channel, a reference signal, and the like. In an implementation, functions of the receiver and the transmitter may be implemented by using a transceiver circuit or a special purpose transceiver chip. The processor may be implemented by using a special purpose processing chip, a special purpose processing circuit, a special purpose processor, or a general purpose chip. In another implementation, program code for implementing functions of the processor, the receiver, and the transmitter is stored in a memory, and a general purpose processor implements the functions of the processor, the receiver, and the transmitter by executing the code in the memory.

Figure 10:
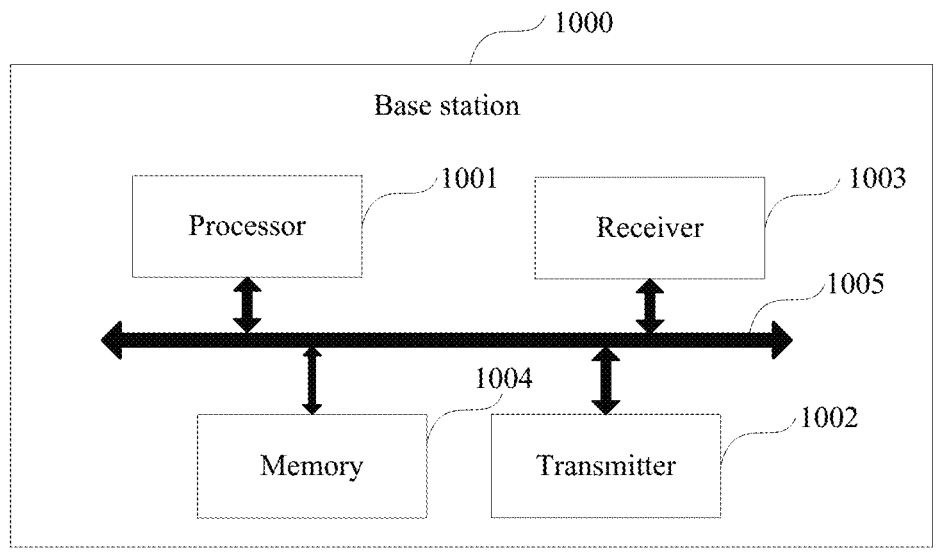
FIG. 10 is a schematic structural diagram of a base station 1000 according to this application.

For example, for an implementation of the second network device or the first network device, refer to FIG. 10. As shown in FIG. 10, a base station 1000 is provided, including: a processor 1001, a memory 1004, a receiver 1003, and a transmitter 1002. The receiver 1003 and the transmitter 1002 are configured to communicate with another network element. The memory 1004 is configured to store a program that can be executed by the processor 1001, where the program includes an instruction used to implement the methods, steps or procedures in the foregoing embodiments. For a specific method, procedure, step, a beneficial effect, and the like, refer to description about such content in the foregoing embodiments. Details are not described herein again.

Figure 11:
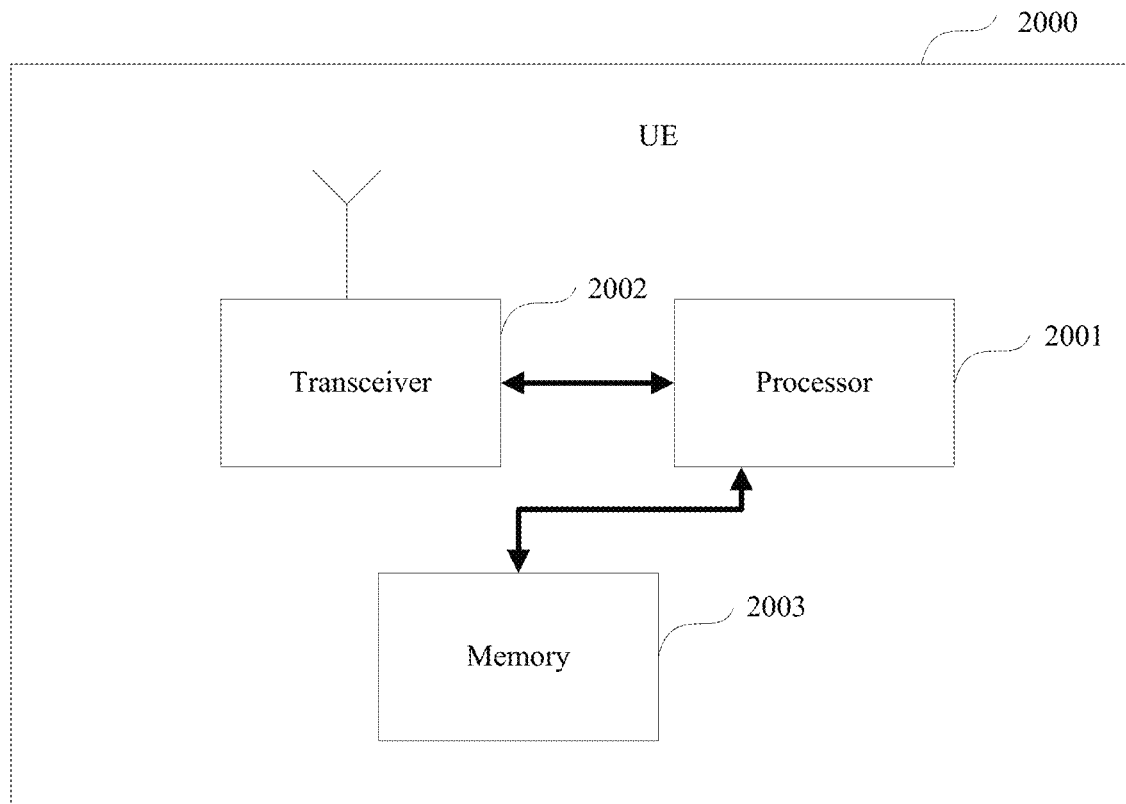
FIG. 11 is a schematic structural diagram of UE 2000 according to this application.

For example, for an implementation of the terminal, refer to FIG. 11. As shown in FIG. 11, a terminal 2000 is provided, including: a processor 2001, a memory 2003, and a transceiver 2002. The transceiver 2002 is configured to communicate with another network element (and may communicate with the another network element by using an antenna). The memory 2003 is configured to store a program that can be executed by the processor 2001, where the program includes an instruction used to implement the methods, steps or procedures in the foregoing embodiments. For a specific method, procedure, step, a beneficial effect, and the like, refer to description about such content in the foregoing embodiments. Details are not described herein again.

When the second network device, the first network device, or the terminal is implemented by software, for a concept, an explanation, a detailed description, or another step related to this application thereof, refer to description about such content in the foregoing embodiments. In this application, the embodiments each may be implemented partly or completely in a form of a computer program product. The computer program product includes one or more computer instructions. When the computer program instruction is loaded and executed on a computer, some or all of the procedures or functions according to the embodiments of this application are generated. The computer may be a general purpose computer, a special purpose computer, a computer network, or another programmable apparatus. The computer instruction may be stored in a computer-readable storage medium, or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like. The storage medium may be integrated into a specific device, module, or processor, or may be separately disposed.

According to the methods provided in this application, this application further provides a communications system, including the second network device, the first network device, and the terminal; or a communications system including the second network device and the first network device.

Obviously, a person skilled in the art may make various modifications and variations to this application without departing from the scope of this application. In this way, this application is also intended to cover these modifications and variations of this application provided that these modifications and variations fall within the protection scope defined by the following claims and their equivalent technologies.

What is claimed is:

1. A method, comprising:
    receiving, by a first network device, a first message sent by a second network device, wherein the first message carries a radio access network paging area (RPA) code corresponding to a cell of the second network device and a broadcast public land mobile network (PLMN) list comprising one or more PLMN identities corresponding to the cell of the second network device, and the RPA code identifies an RPA, wherein the RPA code is a string of bits that identifies the RPA, and wherein the first message is an Xn interface setup request message or a gNB configuration update message;
    sending, by the first network device, a second message to the second network device in response to receiving the first message; and
    receiving, by the first network device, a feedback message sent by the second network device, wherein the feedback message carries a quantity of periodic radio access network-based notification area (RNA) updates of a terminal, and the quantity of periodic RNA updates comprises a quantity of periodic RNA updates already performed after the terminal transits from a connected state to an inactive state.

2. The method according to claim 1, wherein the second message carries an RPA code corresponding to a cell of the first network device.

3. The method according to claim 1, wherein:
    the second message is an Xn interface setup feedback message or a configuration update confirmation message.

4. A first network device, comprising:
    a transceiver;
    a processor; and
    a non-transitory computer-readable storage medium storing a program executable by the processor, the program including instructions for:
        receiving, using the transceiver, a first message sent by a second network device, wherein the first message carries a radio access network paging area (RPA) identifier corresponding to a cell of the second network device and a broadcast public land mobile network (PLMN) list comprising one or more PLMN identities corresponding to the cell of the second network device, the RPA identifier comprises an RPA code and a tracking area code (TAC), and the RPA code identifies an RPA, and wherein the first message is an Xn interface setup request message or a gNB configuration update message;
        sending, using the transceiver, a second message to the second network device in response to receiving the first message; and
        receiving a feedback message sent by the second network device, wherein the feedback message carries a quantity of periodic radio access network-based notification area (RNA) updates of a terminal, and the quantity of periodic RNA updates comprises a quantity of periodic RNA updates already performed after the terminal transits from a connected state to an inactive state.

5. The first network device according to claim 4, wherein: the RPA code is a string of bits that identifies the RPA.

6. The first network device according to claim 4, wherein the second message carries an RPA code corresponding to a cell of the first network device.

7. The first network device according to claim 4, wherein:
the second message is an Xn setup feedback message or a configuration update confirmation message.

8. A non-transitory computer readable storage medium, wherein the non-transitory computer readable storage medium comprises an instruction, and when the instruction is executed on a computer, the computer is caused to:

receive a first message sent by a second network device, wherein the first message carries a radio access network paging area (RPA) code corresponding to a cell of the second network device, an indication of whether the cell of the second network device supports an inactive mode of a terminal, and a broadcast public land mobile network (PLMN) list comprising one or more PLMN identities corresponding to the cell of the second network device, wherein the RPA code identifies an RPA, and wherein the first message is an Xn interface setup request message or a gNB configuration update message;

send a second message to the second network device; and receive a feedback message sent by the second network device, wherein the feedback message carries a quantity of periodic radio access network-based notification area (RNA) updates of a terminal, and the quantity of periodic RNA updates comprises a quantity of periodic RNA updates already performed after the terminal transits from a connected state to an inactive state.

9. The non-transitory computer readable storage medium according to claim 8, wherein:
the RPA code corresponding to the cell of the second network device is a string of bits that identifies the RPA.

10. The non-transitory computer readable storage medium according to claim 8, wherein the second message carries an RPA code corresponding to a cell of a first network device.

11. The non-transitory computer readable storage medium according to claim 8, wherein:
the second message is an Xn interface setup feedback message or a configuration update confirmation message.

* * * * *